United States Patent [19]

Fird et al.

[11] Patent Number: 5,097,588
[45] Date of Patent: Mar. 24, 1992

[54] METHOD OF MAKING A SPRING MOUNTED HEAD ARM ASSEMBLY

[75] Inventors: Randal D. Fird, Boulder; John F. Harris, Boulder; Edward L. Husler, Boulder; Kenneth L. Hutyra, Westminster; Kenneth R. Owens, Longmont; Lester M. Yeakley, Boulder, all of Colo.

[73] Assignee: Storage Technology Corporation, Louisville, Colo.

[21] Appl. No.: 658,216

[22] Filed: Feb. 20, 1991

[51] Int. Cl.⁵ .............................................. G11B 5/42
[52] U.S. Cl. ...................................... 29/603; 360/103
[58] Field of Search .................. 29/603; 360/102, 103, 360/104

[56] References Cited

U.S. PATENT DOCUMENTS 4,759,119  7/1988  Noguchi et al. ................. 29/603

Primary Examiner—Carl E. Hall
Attorney, Agent, or Firm—Dorr, Carson, Sloan & Peterson

[57] ABSTRACT

An attachment of multiple head arm assemblies to an actuator in a magnetic data disk drive system. A leaf spring applies a uniform load against angle surfaces formed on the head arm assemblies. This creates forces on the head arm assemblies to align reference surfaces formed on the head arm assemblies against reference surfaces formed on the carriage. Loads on the head arm assemblies are due to the geometry of the parts rather than on screw torques.

4 Claims, 3 Drawing Sheets

METHOD OF MAKING A SPRING MOUNTED HEAD ARM ASSEMBLY

BACKGROUND OF THE INVENTION

1. Field of the Invention

This invention relates to the field of read/write magnetic head arm assemblies for disk drives data storage systems.

2. Statement of the Problem

In magnetic disk drives, a plurality of magnetic disks are rotated about a common spindle while a plurality of read/write magnetic heads are positioned adjacent the disks to read/write data on the disks. The read/write heads are typically mounted on head arm assemblies which in turn are attached to an actuator. The actuator positions the heads adjacent different tracks on the disks. The positioning of the read/write heads adjacent the disks requires a precision on the order of 10 micro inches In previous devices, the head arm assemblies are typically mounted to the actuators by a plurality of screws.

The use of a plurality of screws to mount the head arm assemblies on the actuator creates a number of problems The screws, in the process of inserting and tightening, can generate debris contamination. Due to the nature of magnetic disk drives, contamination can affect the performance of the data storage on the disks as well as the precision of the positioning of the heads relative to the disks. The screws may not be properly torqued, thus affecting uniform loading on the head arm assemblies. The screws may loosen during the life of the operation of the disk drive, which may damage or cause misalignment of the device. The screws may not seat properly, or may not seat the head arm assemblies properly, thus causing misalignment of the read/write heads.

The arm design used with the screw attachments is not self-aligning, thus increasing costs of assembly. The use of a plurality of screws adds mass to the actuator. Other problems arising with the use of a plurality of screws to fasten the head arm assembly to the actuator include susceptibility to thermal distortion and warpage due to use and low damping capability.

The use of screw attachments created a rigid structure which did not allow for tolerance stackups.

Thus, the need exists for a head arm assembly which is attachable to an actuator without the need for a plurality of screws. There is a further need for a head arm assembly which is self-aligning and does not significantly increase the mass of the actuator.

3. Solution to the Problem

These and other problems are solved by the present invention. The present invention provides a spring mounted head arm which requires few or no screws to attach the head arm assembly to the actuator.

The present invention provides a head arm assembly which is self-aligning relative to the actuator.

The present invention provides a head arm assembly which minimizes distortion due to temperature rise and use.

The present invention provides a head arm assembly which is uniformly loaded by the attachment to the actuator.

The present invention provides a head arm assembly using a resilient force which compensates for tolerance stackups.

SUMMARY OF THE INVENTION

The present invention provides for the attachment of multiple head arm assemblies to an actuator in a magnetic data disk drive system. The attachment method uses a leaf spring to apply a uniform load against angle surfaces formed on the head arm assemblies. The spring produces forces on the head arm assemblies to align reference surfaces formed on the head arm assemblies against reference surfaces formed on the carriage while tolerance stackups occur.

The reference surfaces include abutment surfaces formed on pins mounted on the upper and lower end portions of the head arm assemblies. These surfaces abut against the end surfaces of the actuator carriage. The head arm assemblies also include an angled surface which mates against a matching surface on the actuator carriage.

The loads on the head arm assemblies are due to the geometry of the parts rather than on screw torques. The head arm assemblies can be quickly mounted with few or no screws, thus eliminating the uneven use of screw torques or debris generation due to screws. The head arm assembly mounting provides a low mass attachment having damping capabilities.

These and other features of the present invention will become evident from following description of the preferred embodiment in conjunction with the drawings.

DETAILED DESCRIPTION OF A PREFERRED EMBODIMENT

Figure 1:
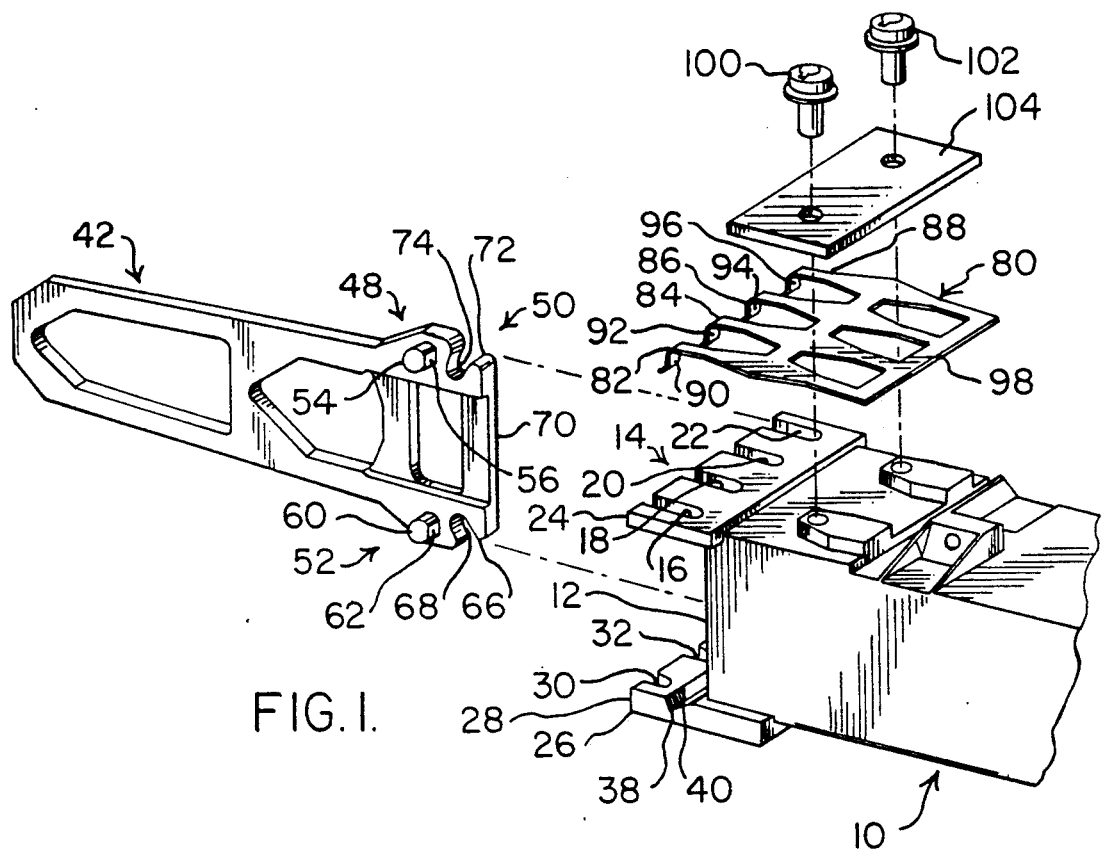
FIG. 1 is a perspective view an embodiment of the present invention in separate components.
Figure 2:
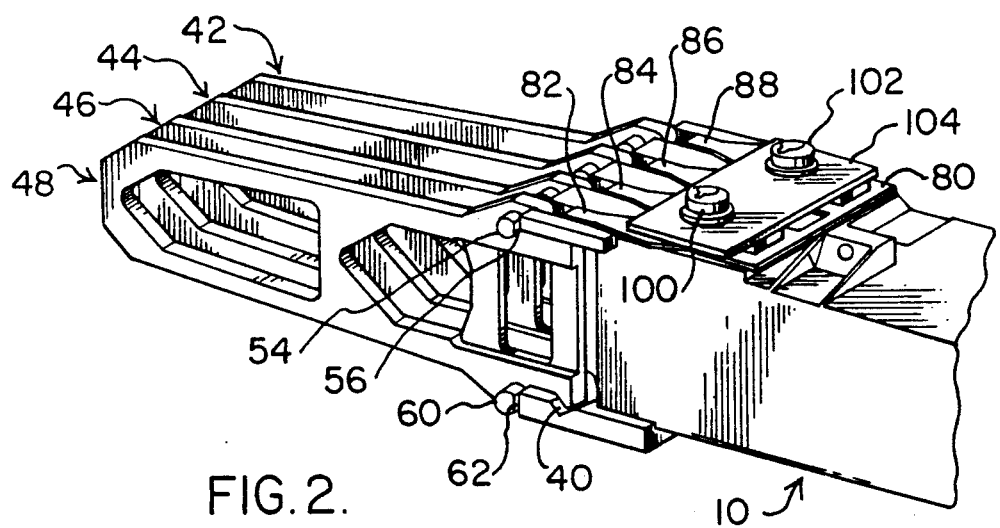
FIG. 2 is a perspective view of the assembled embodiment.

One possible preferred exemplary embodiment of the present invention is illustrated in FIG. 1. A carriage 10 is adapted to be linearly movable within an actuator mechanism, such as a voice coil motor, (not shown). The carriage 10 of the preferred embodiment is designed to have up to four head arm assemblies 42, 44, 46, 48 mounted thereon as shown in FIG. 2. It is to be understood that this description of the preferred embodiment is for the purpose of explaining the present invention only. This description is not meant to limit the scope of the inventive concept as claimed. Any number or shape of head arm assemblies can be utilized.

The front end 12 of the carriage 10 includes an upper end portion 14 formed as part thereof or affixed thereto. Four narrow slots 16, 18, 20, 22 are formed in the upper end portion 14. These slots are spaced apart and parallel to one another. The slots open into the front edge surface 24 of the upper end portion 14. The front edge surface 24 forms an upper alignment surface as discussed below.

The lower end portion 26 formed as part of or affixed to the bottom element 10 extends from the front end 12 of the carriage 10 with a lower front edge surface 28 forming an alignment surface which lies in same plane as the upper alignment surface 24. Lower slots 30, 32, 34 (not shown), 36 (not shown) are also formed in the lower end portion 26 aligned with the upper slots 16, 18, 20, 22. The lower slots extend into the carriage a shorter distance than do the upper slots.

A substantially V-shaped groove 38 is formed in the lower end portion 26 spaced from and extending parallel to the lower alignment surface 28. The front surface 40 of the V-shaped groove 38 forms an alignment surface for the head arm assemblies, as further detailed below. A head arm assembly such as 42, shown in FIGS. 1 and 2, typically includes read/write heads (not shown) mounted on the forward suspension end of the head arm assembly and a flex circuit (not shown) with the associated read/write electronics.

A head arm assembly 42 is illustrated in FIG. 1. The head arm assembly includes a read/write head mounting portion on the front end of the assembly. The rear end portion 48 of the head arm assembly has an upper portion 50 adapted to fit within upper slot of the carriage 10, and a lower portion 52 adapted to fit within a lower slot of the carriage 10, to align the head arm assembly in a first plane including the longitudinal axis of the head arm assembly 42.

Pin 54 is inserted through the upper portion of the head arm assembly 42 in a plane substantially perpendicular to the longitudinal axis of the head arm assembly. The pin 54 extends beyond both sides of the head arm assembly. Precision flat surfaces 56, 58 (not shown) are formed on the sides of pin 54 perpendicular to the head arm assembly to form alignment surfaces on both sides of the head arm assembly. A second pin 60 is inserted through the lower portion of the head arm assembly 42 extending perpendicular to the longitudinal axis of the head arm assembly. The lower pin also includes flat surfaces 62, 64 (not shown) perpendicular to the head arm assembly 42, forming alignment surfaces on both sides of the head arm assembly Surfaces 56, 58, 62, 64 form a mounting plane on the assembly.

An angular surface 66 is formed on the lower end portion 52 of the head arm assembly 42. This surface extends downward and outward in a notch 68 formed a predetermined distance from the flat surfaces 62, 64 of the arm assembly. The angular surface 66 is designed to mate with the front surface 40 of the V-groove 38 formed in the lower end portion of the carriage 10.

The upper end portion 50 of the head arm assembly 42 also includes an angular surface 72 formed therein, which extends upward and outward in a notch 74 spaced from the flat surfaces 62, 64 of the head arm surface. This surface 72 forms a spring engaging surface further detailed below.

The head arm assembly 42 is inserted in the carriage 10 so that the upper end portion 50 lies within one of the upper slots of the carriage and the lower end portion 52 lies within the aligned lower end slot. The flat surfaces 56, 58 (not shown) on upper pin 54 abut the upper alignment surface 24 of the carriage and the flat surfaces 62, 64 (not shown) on lower pin 60 abut the lower alignment surface 28 of the carriage. The lower portion angular surface 66 is flush against the front surface 40 of the V-groove 38 of the carriage lower portion. It is to be expressly understood that other embodiments and variations of alignment surfaces and slots are contemplated as being within the scope of the claimed invention.

Figure 3:
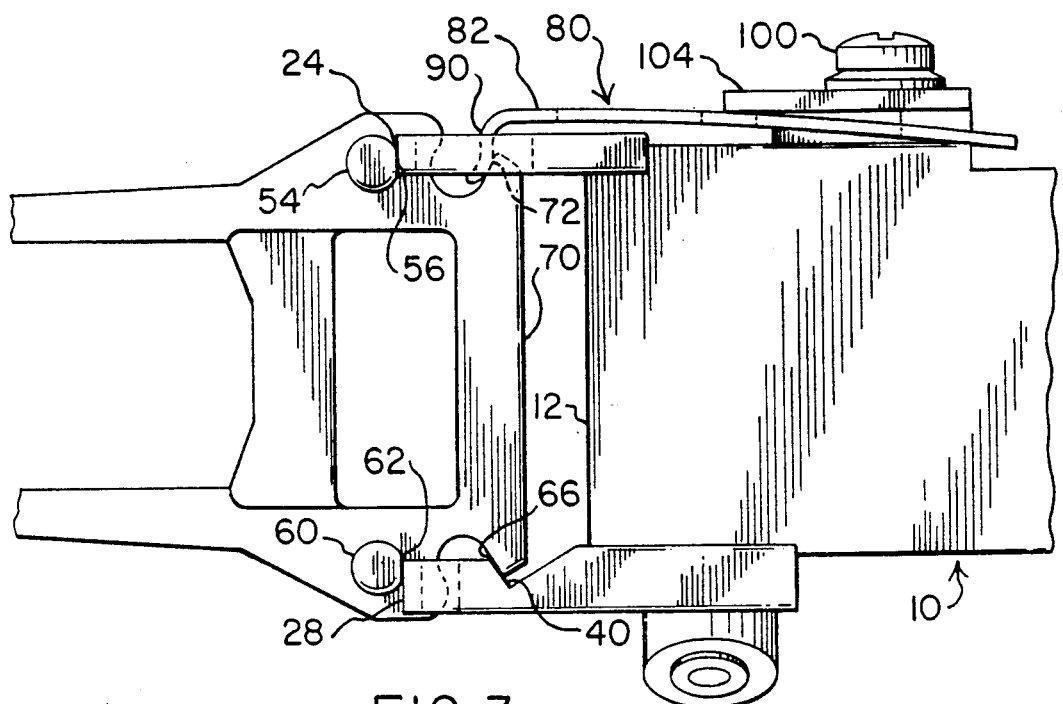
FIG. 3 is a partial side view of FIG. 2.

A stamped metal leaf spring 80 is used to secure the head arm assemblies to the carriage. The leaf spring 80 is formed with four arms 82, 84, 86, 88, matching the number of head arm assemblies 42–48 mounted on the carriage 10. Each arm includes a downwardly extending tip portion 90, 92, 94, 96 which engages the angular surface 72 of the upper portion of the head arm assembly In the embodiment of FIGS. 1-3, the rear end portion 98 of the spring 80 is attached to the carriage by screws 100, 102 and retainer plate 104. As the spring 80 is clamped down on the carriage, the tip portions 90-96 of the spring engage the angular surfaces 72 on the upper portion of the head arm assembly The spring tip portions 90-96 exert a uniform force on the head arm assemblies, forcing the flat surfaces 56, 58, 62, 64 on the pins against the end surfaces 24, 28 of the carriage and the angular surface 66 on the lower end portion of the assemblies against the front surface 40 of the V-groove 38 of the carriage. Thus, the head arm assemblies are precisely aligned as well as uniformly loaded. The assemblies can be quickly and easily mounted without the use of a large number of screws which create uneven loading and added mass to the system. This mounting method provides a resilient force which compensates for tolerance stackups.

Figure 4:
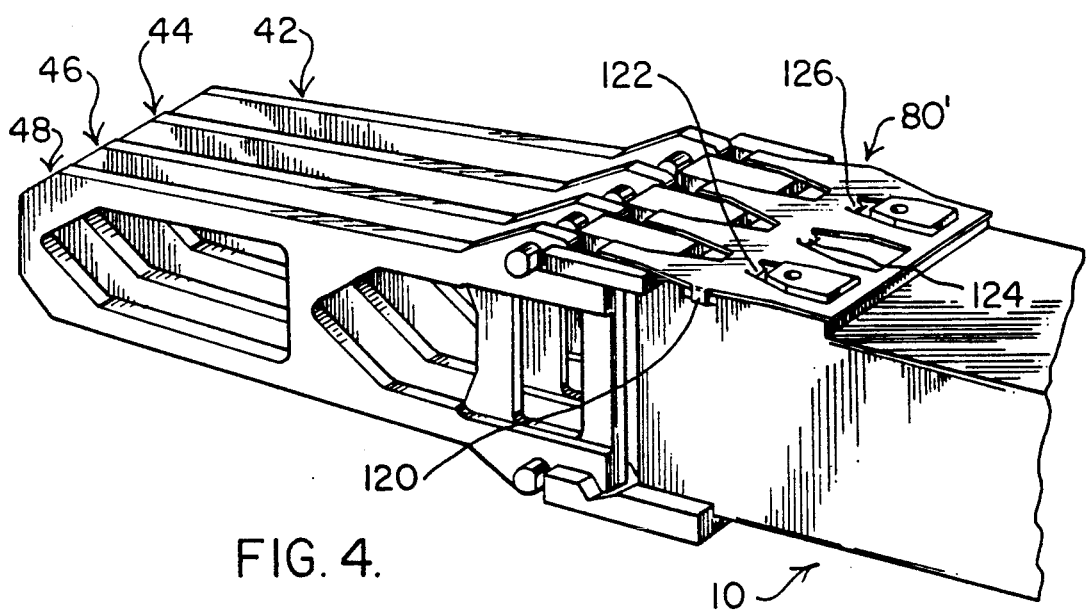
FIG. 4 is a perspective view of a second embodiment of the present invention.
Figure 5:
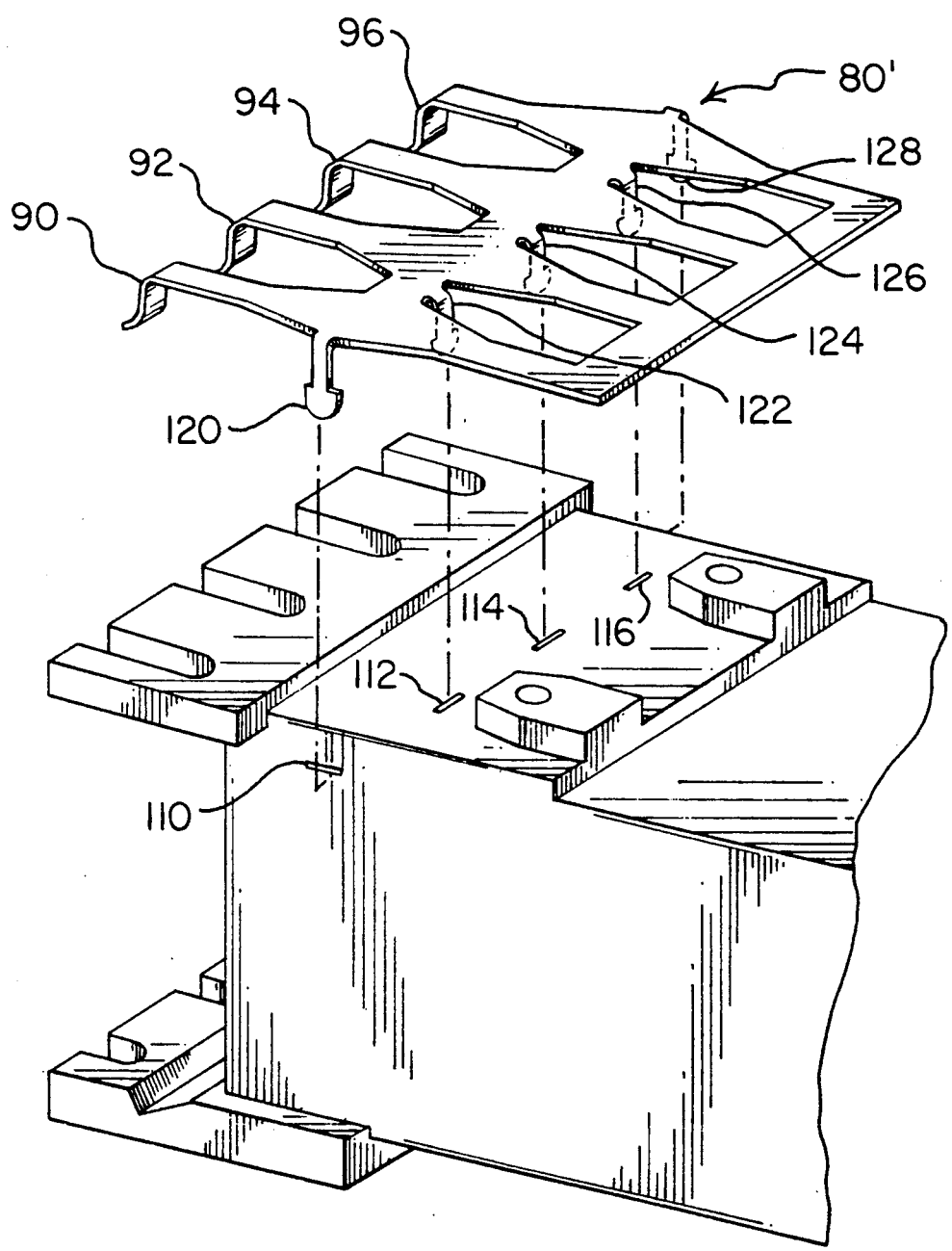
FIG. 5 is an exploded view of the embodiment of FIG. 4.

The present invention is not meant to be limited to the above description of the preferred embodiment. Other variations are contemplated to be within the scope of the claimed inventive concept. For instance, in the embodiment of FIGS. 4 and 5, the spring 80' includes downwardly extending hooks 120, 122, 124, 126 which are inserted into slits 110, 112, 114, 116 formed in the surface of the carriage. An additional slit is formed on the far side of the carriage not shown in these Figures for hook 128. Hooks 120 and 128 are bent an additional 90 degrees to prevent spring 80' from moving vertically while hooks 122-126 prevent spring 80' form lateral movement This embodiment does not require screws.

Other variations are considered to be within the claimed inventive concept of providing a spring mounted attachment of head arm assemblies onto an actuator.

We claim:

1. A method for mounting a head arm assembly to an actuator, respectively said method comprising the steps of:

(a) inserting an angular surface formed on the lower end portion of said head arm assembly into an opposing angular surface formed on the top surface of the lower end portion extending from said actuator;

(b) inserting the upper end portion of said head arm assembly into a slot formed in the upper end surface of said actuator;

(c) mounting a spring clamp having an downwardly extending angular arm on said actuator so that said arm engages an opposing angular surface formed on said head arm assembly;

(d) tightening said spring clamp on said actuator to apply a force from said arm against said opposing angular surface on said head arm assembly to force reference surfaces formed on said upper end portion of said head arm assembly and reference surfaces formed on said lower end portion of said head arm assembly to abut against upper end surfaces and lower end surfaces of said actuator.

2. The method of claim 1 wherein step (d) further includes forming said upper reference surfaces on a pin extending beyond the sides of said head arm assembly perpendicularly to the longitudinal axis of said head arm assembly and forming said lower reference surfaces on a pin extending beyond the sides of said head arm assembly perpendicularly to the longitudinal axis of said head arm assembly.

3. The method of claim 2 wherein step (c) further includes mounting said spring clamp by screws on to said actuator.

4. The method of claim 2 wherein step (c) further includes mounting said spring clamp by resiliently clamping said spring clamp on said actuator.

* * * * *